United States Patent [19]

Harwoods

[11] 4,244,135
[45] Jan. 13, 1981

[54] FLY AND INSECT TRAP

[76] Inventor: Harry A. Harwoods, 16654 Blumfield, Roseville, Mich. 48066

[21] Appl. No.: 963,779

[22] Filed: Nov. 27, 1978

Related U.S. Application Data

[63] Continuation-in-part of Ser. No. 677,982, Apr. 19, 1976, abandoned.

[51] Int. Cl.³ .............................................. A01M 1/02
[52] U.S. Cl. .................................................... 43/122
[58] Field of Search .................. 43/118, 121, 122, 65, 43/107

[56] References Cited

U.S. PATENT DOCUMENTS

| 433,574 | 8/1890 | Lawton | 43/118 |
|---|---|---|---|
| 882,306 | 3/1908 | Fredrickson | 43/122 |
| 893,943 | 7/1908 | Sellman | 43/65 |
| 1,057,224 | 3/1913 | Davis | 43/121 |
| 1,410,298 | 3/1922 | Harned | 43/118 |
| 1,924,379 | 8/1933 | Reese | 43/122 |
| 3,807,081 | 4/1974 | Chapiewsky | 43/118 |
| 3,820,273 | 6/1974 | Novak | 43/122 |
| 3,855,727 | 12/1974 | Canoy | 43/122 |

FOREIGN PATENT DOCUMENTS

| 744269 | 4/1933 | France | 43/65 |
|---|---|---|---|
| 10641 | of 1914 | United Kingdom | 43/122 |

Primary Examiner—Nicholas P. Godici
Attorney, Agent, or Firm—Gifford, VanOphem, Sheridan & Sprinkle, P.C.

[57] ABSTRACT

An improved fly and insect trap is provided and comprises a housing and a tubular frusto conical member. The frusto conical member is open at each axial end and is removably secured to and contained within the housing so that the apex is vertically above the base of the frusto conical member. An annular capture chamber open only through the apex opening of the frusto conical portion is formed between the housing and the frusto conical member. A tray of insect bait is disposed beneath the base of the frusto conical member so that insects flying upwardly from the bait pass upwardly through the apex of the frusto conical member and into the capture chamber. The insects are unable to escape from the capture chamber and will either die within the chamber or they can be removed alive for disposal.

9 Claims, 4 Drawing Figures

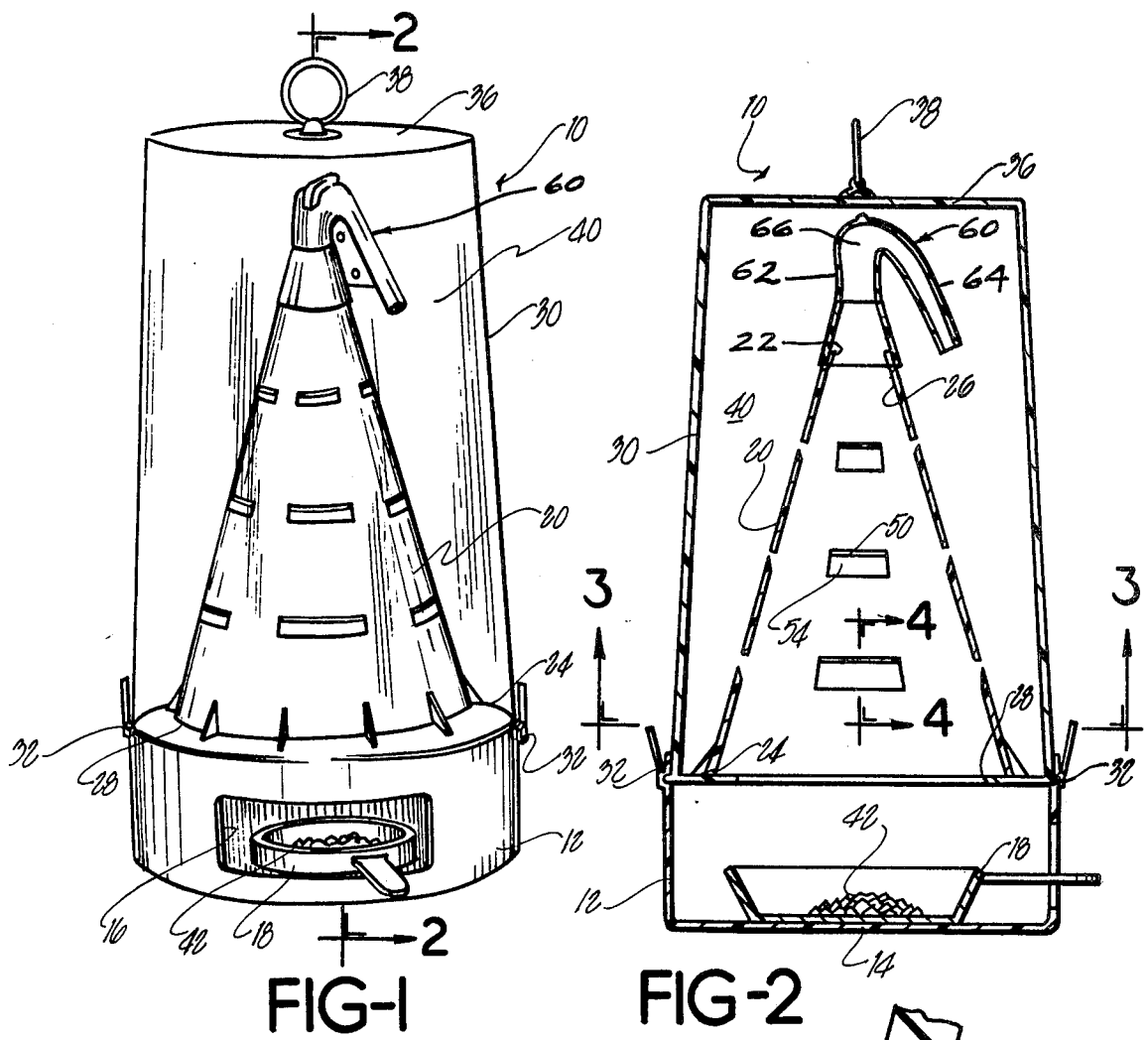
FIG-1
FIG-2
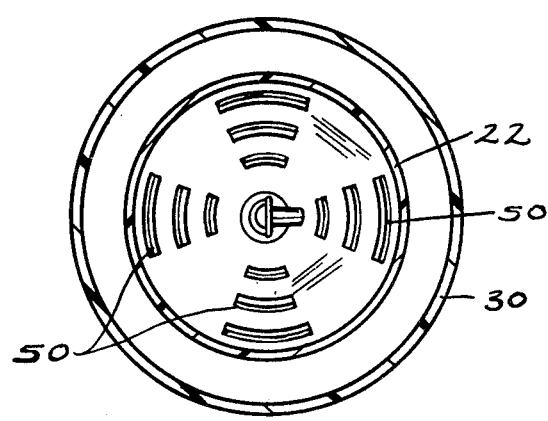
FIG-3
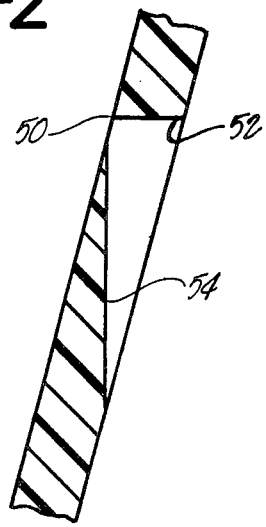
FIG-4

FLY AND INSECT TRAP

CROSS-REFERENCES

This application is a continuation-in-part application of Ser. No. 677,982, entitled FLY AND INSECT TRAP and filed Apr. 19, 1976 now abandoned.

BACKGROUND OF THE INVENTION

I. Field of the Invention

The present invention relates to fly and insect traps and more particularly to such a trap including a frusto conical member and means for enticing the insects through the frusto conical member to a capture chamber.

II. Description of the Prior Art

There have been many previously known fly and insect traps. Several of these previously known traps utilize a tubular frusto conical member open at each end and means to entice the insect through the apex opening of the frusto conical member. An annular capture chamber is formed between an outer housing and the frusto conical member and insects entrapped within the capture chamber eventually die within the chamber.

There have been several previously known devices to entice the insects up through the frusto conical member. For example, in one type of these previously known devices, a light source is contained within the housing above the apex of the frusto conical member to entice the insects up through the frusto conical member. This type of previously known insect trap, is disadvantageous in that not only does the insect trap consume electrical power but it is often inconvenient to connect a source of electrical power to the trap. Moreover, the light source in this type of previously known insect trap eventually fails which necessitates replacement of the light sources. In addition, the insect trap is inoperable until discovery and replacement of the light source.

Other previously known fly and insect traps suspend a bait from the housing and above the apex of the frusto conical member in order to entice the insects up through the frusto conical member and into a capture chamber. These previously known traps, however, are disadvantageous in that replenishment of the bait is not only a messy operation, but also requires removal of the housing from the frusto conical member in order to gain access to the bait. Consequently, all insects within the capture chamber of the trap must be dead before the bait can be replaced; otherwise, still living insects within the capture chamber would escape upon removal of the housing from the frusto conical member.

A still further disadvantage with this latter type of insect trap is that insects entrapped within the capture chamber will oftentimes try to alight upon the top of the frusto conical member and, in doing so, pass through the open apex and escape from the trap.

SUMMARY OF THE PRESENT INVENTION

The fly and insect trap of the present invention obviates the above mentioned disadvantages of the previously known traps by providing a fly and insect trap which requires no artificial light source and in which the bait for the fly trap is easily accessible without disassembly of the trap.

In brief, the fly trap of the present invention comprises a tubular frusto conical member open at each end and removably secured to and within a housing. One leg of a tubular U-shaped member is positioned over and in registry with the apex of the frusto conical member. The apex of the frusto conical member is disposed vertically above the base of the member so that insects passing through the apex opening and the U-shaped member are entrapped within a capture chamber defined between the housing and the frusto conical member.

A tray of insect bait is disposed beneath the base of the frusto conical member and the odor of the bait attracts insects to feed from the tray. Insect bait is bait of numerous varieties from any source, dispelling an odor most often indigenous to insects while being undetectable to humans. Said bait plus the odor from it and together with light from any source are the three basic essentials or factors which act or exist in concert with one another to provide the formula for the superb effectiveness of this device. Conversely, removal of any of the three impairs the effectiveness of the trap.

Most insects fly vertically upward as they fly away from a landing. Consequently, as the insects fly away from the tray of bait, the insects fly vertically upward into the interior of the frusto conical member. As the insects continue to ascend, they pass through the apex opening of the frusto conical member and the interior of the U-shaped member and into the capture chamber. Since the other leg of the U-shaped member not only has a small diameter opening, but also points downwardly so that insects cannot alight on it, the insects are unable to escape from the capture chamber and eventually die within the chamber.

In order to further insure that the insects fly vertically upward from the tray of bait, both the housing and the frusto conical member are constructed of a translucent material, such as plastic, so that natural light passes through the housing and the frusto conical member and projects down onto the tray of bait. Thus, the insects instinctively fly upward towards the light source and pass through the apex opening of the frusto conical member and into the capture chamber.

BRIEF DESCRIPTION OF THE DRAWINGS

A better understanding of the present invention will be had upon reference to the following detailed description when read in conjunction with the accompanying drawing wherein like reference characters refer to like parts throughout the several views and in which:

FIG. 1 is a front plan view of the fly and insect trap of the present invention;

FIG. 2 is a cross-sectional view of the fly and insect trap of the present invention taken substantially along line 2—2 in FIG. 1;

FIG. 3 is a transverse cross-sectional view taken substantially along line 3—3 of FIG. 2; and FIG. 4 is a cross-sectional view taken substantially along line 4—4 in FIG. 2 and enlarged for clarity.

DETAILED DESCRIPTION OF THE PRESENT INVENTION

With reference to the drawing the fly and insect trap 10 of the present invention is thereshown and comprises a tubular and cylindrical base portion 12 with a bottom 14 which is preferably integral with the base portion 12 with a bottom 14 which is preferably integral with the base portion 12. A sidewall opening 16 (FIG. 1) is provided through the base portion 12 and is dimensioned so that a tray 18 may be inserted through the sidewall opening 16 and placed on the bottom 14 of the base portion 12.

A tubular frusto conical member 20 constructed of a translucent material such as plastic, is secured to the top of the base portion 12 in any conventional manner. As shown in the drawing, the axis of the frusto conical member 20 is generally vertical with the apex 22 positioned vertically above the base 24. In addition, the frusto conical member 20 includes a small diameter apex opening 26 and a comparatively large diameter base opening which is disposed vertically above and open via an opening 28 to the tray 18.

As best shown in FIGS. 3 and 4, preferably four slots 50 are formed through the frusto conical member 20 at each of three axially spaced positions along the member 20. Each slot 20 is circumferentially elongated for approximately 45° and, as shown in FIG. 4, each slot 50 is formed by a radial wall portion 52 and an axial wall portion 54 in the member 20. Thus, while the slots 50 are sufficiently narrow to prohibit insects from passing therethrough, there is relatively wide access to the slots 50 from the interior of the member 20. The purpose of the slots 50 will be later described.

A tubular U-shaped member 60 is provided having a pair of legs 62 and 64 joined together at one end and a hollow interior 66. The free end of each leg 62 and 64 is open at each end and the free end of the leg 62 fits over and registers with the frusto conical apex opening 26.

A substantially tubular and cylindrical outer housing 30 constructed of a translucent material such as plastic is removably secured to the base portion 12 so that the frusto conical member 20 is received coaxially within the outer housing 30. The housing 30 preferably just sits on the top of the base portion 12 and extensions 32 retain the housing 30 in place.

The housing 30 includes a top cover 36 which is preferably integral with the outer housing 30. A ring 38 is attached to the interior of the cover 36 and facilitates removal of the housing 30 from the base portion 12.

With the outer housing 30 secured to the base portion 12, an annular capture chamber 40 is formed between the base portion 12, outer housing 30 and the frusto conical member 20. Thus, the only entrance or exit from the capture chamber 40 is a relatively small diameter opening at the free end of the leg 64 of the U-shaped member 20.

In operation, an insect bait 42 is placed within the tray 18 and the tray 18 is thereafter inserted through the sidewall opening 16 and placed on the bottom cover 14 of the base portion 12. The fly and insect trap 10 is then placed at a location designed to attract flies or other flying insects.

Flying insects, attracted by the odor from the bait 42, enter the trap 10 through the sidewall opening 16 in the base portion 12 and feed from the bait 42. After feeding from the bait 42, the insects instinctively fly vertically upward into the interior of the frusto conical member 20. Then, due to the translucency of both the outer housing and the frusto conical member 20 instinctively the insects continue to fly upwardly towards the light and fly out through the small diameter apex opening 26 of the member 20, through the interior 66 of the U-shaped member 60 and into the capture chamber 40. Due to the relatively large volume of the capture chamber 40 and ther relatively small diameter of the opening at the free end of leg 64 of the U-shaped members, the insects are unable to escape from the capture chamber 40 and eventually die within the capture chamber 40. Moreover, since the leg 64 of the U-shaped member 60 points downwardly towards the base portion 12, insects will not alight on the member 60 and undesirably escape from the capture chamber 40 as with the previously known insect traps. In practice, there is virtually an infinitesimal chance that insects will escape the capture chamber by flying up through the interior of the U-shaped member 60.

It is to be understood that it is the combination of the odor from the bait, the odor from the bait, the natural light and the phenomena that insects fly vertically upward from a landing that insures the overall effectiveness of the trap 10 of the present invention.

When it is necessary to replace the bait 42, the tray 18 is simply removed through the sidewall opening 16, replenished with bait 42 and returned through the opening 16 and placed onto the bottom cover 14. Thus, unlike the previously known fly and insect traps of this type, it is unnecessary to detach the outer housing 30 from the base portion 12 in order to replenish the bait 42.

When a sufficient number of insects have been captured and killed within the capture chamber 40, the outer housing 30 is removed from the base portion 12 and the dead insects are disposed of in the appropriate manner.

After prolonged use of the trap 10, it has been found that the odor from the bait 42 tends to hover and collect at the free end of the leg 64 of the member 60. As a result, it has been found that insects entrapped within the capture chamber 40 fly towards the bait odor and theoretically could escape through the interior 60 of the member 20. The slots 50, however, solve this problem by dispersing the bait odor throughout the capture chamber 40 as shown by arrows 56 (FIG. 2).

It can, thus, be seen that the fly and insect trap of the present invention provides a novel trap which requires not artificial light source and in which the bait may be replenished without removing the housing 30 from the base portion 12.

Having thus described my invention, many modifications thereto will become apparent to those skilled in the art to which it pertains without deviation from the spirit of the invention as defined by the scope of the appended claims.

I claim:

1. An insect trap comprising an outer housing, a base portion and a tubular frusto conical member open at its apex and at its base secured to said base portion and contained within said housing thereby defining a capture chamber between said housing and said frusto conical member wherein the axis of said frusto conical member is generally in a vertical direction with the apex of the frusto conical member above the base, means for positioning insect bait beneath the base of said frusto conical member and a tubular U-shaped member having two legs and open at the free end of each leg, the open end of one leg being positioned over and in registry with the apex of the frusto conical member so that the other leg extends downwardly towards the base portion and is open at its free end to the capture chamber.

2. The invention as defined in claim 1 wherein said outer housing and said frusto conical member are constructed of a translucent material.

3. The invention as defined in claim 1 wherein said means comprises said base portion being attached to the base of the frusto conical member and having a bottom cover, said base portion having a sidewall opening through which an insect bait is inserted and placed on the bottom cover of said base portion.

4. The invention as defined in claim 3 and including a tray for holding said insect bait, said tray being removably insertable through said sidewall opening.

5. The invention as defined in claim 1 and in which said housing is removably mounted to said base portion.

6. The invention as defined in claim 1 and including at least one circumferentially elongated slot formed through said frusto conical member.

7. The invention as defined in claim 1 and including a plurality of axially spaced circumferentially elongated slots formed through said frusto conical member.

8. The invention as defined in claim 7 wherein each slot is formed by a radial wall portion and an axial wall portion on the interior of said frusto conical member.

9. The insect trap as defined in claim 1 wherein the insect bait has an aroma and said trap further comprises means for distributing the aroma of said bait from the bait beneath said frusto conical member to said capture chamber, thereby attracting flying insects into said capture chamber.

* * * * *

UNITED STATES PATENT AND TRADEMARK OFFICE
CERTIFICATE OF CORRECTION

PATENT NO. : 4,244,135
DATED : January 13, 1981
INVENTOR(S) : Harry A. Harwoods

It is certified that error appears in the above-identified patent and that said Letters Patent are hereby corrected as shown below:

Column 4, line 8, delete "the odor from the bait".

Signed and Sealed this

Fourteenth Day of April 1981

[SEAL]

Attest:

RENE D. TEGTMEYER

Attesting Officer     Acting Commissioner of Patents and Trademarks